(12) United States Patent
Suzuki et al.

(10) Patent No.: US 11,378,258 B2
(45) Date of Patent: Jul. 5, 2022

(54) LINE LIGHTING DEVICE

(71) Applicant: YAZAKI CORPORATION, Tokyo (JP)

(72) Inventors: Yasuo Suzuki, Shizuoka (JP); Sho Okamura, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 42 days.

(21) Appl. No.: 17/071,066

(22) Filed: Oct. 15, 2020

(65) Prior Publication Data
US 2021/0116106 A1  Apr. 22, 2021

(30) Foreign Application Priority Data
Oct. 16, 2019  (JP) .............. JP2019-189216

(51) Int. Cl.
*F21V 17/10*  (2006.01)
*F21V 8/00*  (2006.01)
*F21Y 115/10*  (2016.01)

(52) U.S. Cl.
CPC .............. *F21V 17/10* (2013.01); *G02B 6/001* (2013.01); *F21Y 2115/10* (2016.08)

(58) Field of Classification Search
CPC ....... F21V 17/10; G02B 6/001; F21Y 2115/10
USPC .......................................................... 362/581
See application file for complete search history.

(56) References Cited

U.S. PATENT DOCUMENTS

2014/0029292 A1* 1/2014 Mizushiro ................ B60Q 3/78
362/565

FOREIGN PATENT DOCUMENTS

JP  2016-016771 A  2/2016

* cited by examiner

*Primary Examiner* — Rajarshi Chakraborty
*Assistant Examiner* — Hana S Featherly
(74) *Attorney, Agent, or Firm* — Sughrue Mion, PLLC (57) ABSTRACT

A line lighting device includes a light emitting unit, a light guide rod and a case. The light emitting unit includes a light emitter emitting light. The light guide rod transmits the light emitted by the light emitting unit and guides the light in a longitudinal direction thereof. The case includes a case main body receiving the light guide rod therein. The light emitting unit is installed to the light guide rod and the case by rotating the light emitting unit by a predetermined angle with respect to the light guide rod and the case, while maintaining a state where a first end of the light guide rod in the longitudinal direction of the light guide rod is opposed to the light emitter.

8 Claims, 8 Drawing Sheets

FIRST END SIDE
(REAR SIDE)

FIG. 10D

FIRST END SIDE
(REAR SIDE)

FIG. 10B

INTERMEDIATE PORTION

FIG. 10E

INTERMEDIATE PORTION

FIG. 10C

SECOND END SIDE
(FRONT SIDE)

FIG. 10F

SECOND END SIDE
(FRONT SIDE)

LINE LIGHTING DEVICE

CROSS-REFERENCE TO RELATED APPLICATION

The present application is based on, and claims priority from Japanese Patent Application No. 2019-189216, filed on Oct. 16, 2019, the entire contents of which are incorporated herein by reference.

TECHNICAL FIELD

The disclosure relates to a line lighting device.

BACKGROUND

Conventionally, there has been known a lighting device including a light emitting member, a light guide and a housing (see JP 2016-16771). The light emitting member includes a light source. The light guide is adapted to guide light of the light source incident from an incident surface which is an end surface thereof in a longitudinal direction. The housing accommodates the light emitting member and the light guide.

The light emitting member is formed with a receiving recess recessed in a direction different from a moving direction for engaging the light emitting member with the housing. The different direction is set in such a direction that an end portion of the light guide is fitted into the receiving recess while being bent by a movement of the light emitting member in the moving direction.

SUMMARY

The conventional lighting device is installed and used in a vehicle, for example. In the conventional lighting device, a fixing direction of the end portion of the light guide and the light emitting member is not orthogonal to a fixing direction of the light emitting member and the housing. When vibration or the like occurs due to traveling of the vehicle, there is a possibility that a positional relationship between the light emitting member and the end portion of the light guide is shifted due to the vibration or the like. Thus, in the conventional lighting device, a light emission of the light guide may not be stable.

It is an object of the disclosure to provide a line lighting device capable of stabilizing a light emission of a light guide by eliminating a positional relationship shift between a first end of a light guide rod, which is one end of the light guide rod in a longitudinal direction, and a light emitter of a light emitting unit, even when vibration or the like occurs.

According to an embodiment, there is provided a line lighting device including: a light emitting unit that includes a light emitter emitting light; a light guide rod formed in a rod-like shape that transmits the light emitted by the light emitting unit and guides the light in a longitudinal direction thereof; and a case formed in a rod-like shape that includes a case main body being partially opened when viewed from a longitudinal direction thereof and receiving the light guide rod therein, wherein the light guide rod has a first end which is one end in the longitudinal direction thereof, and the light emitting unit is installed to the light guide rod and the case by rotating the light emitting unit by a predetermined angle with respect to the light guide rod and the case, while maintaining a state where (i) the first end of the light guide rod is opposed to the light emitter of the light emitting unit and (ii) an end surface of the first end of the tight guide rod is parallel to a light emitting surface of the light emitter of the light emitting unit.

It is preferred that the case main body has a first end which is one end in the longitudinal direction thereof and a second end which is another end in the longitudinal direction thereof, and the case is formed in at least one of a first mode, a second mode and a third mode, the first mode being a mode in which (i) the case is provided with a rib protruding from an outer periphery of the case main body and extending in the longitudinal direction of the case main body, and (ii) a protrusion amount of the rib from the case main body at a side of the first end of the case main body is larger than a protrusion amount of the rib from the case main body at a side of the second end of the case main body, the second mode being a mode in which (i) the case is provided with a rib protruding from an outer periphery of the case main body and extending in the longitudinal direction of the case main body, and (ii) a thickness of the rib at a side of the first end of the case main body is larger than a thickness of the rib at a side of the second end of the case main body, and the third mode being a mode in which a wall thickness of the case main body at a side of the first end of the case main body is larger than a wall thickness of the case main body at a side of the second end of the case main body.

It is preferred that in the first mode, the protrusion amount of the rib increases stepwise from the second end of the case main body to the first end of the case main body, in the second mode, the thickness of the rib increases stepwise from the second end of the case main body to the first end of the case main body, and in the third mode, the wall thickness of the case main body increases stepwise from the second end of the case main body to the first end of the case main body.

It is preferred that the case main body is provided with a locking part used for installing the case to a case installation body, at the outer periphery thereof, in the first mode, the locking part is provided at a position where the protrusion amount of the rib is relatively large, and in the second mode, the locking part is provided at a position where the thickness of the rib is relatively large.

It is preferred that the light emitting unit includes a light emitting unit housing, the light emitter is provided in the light emitting unit housing, the light emitting unit housing includes a light emitting unit housing body part, and a light emitting part for emitting the light of the light emitter to an outside of the light emitting unit housing, the case includes a light emitting unit holding part for holding the light emitting unit housing, one of the case and the light guide rod is provided with a light emitting part engaging part for engaging with the light emitting part, the light emitting unit housing body part is inserted into the light emitting unit holding part by a rotation of the light emitting unit to the case and the light guide rod in a state where the light emitting part engaging part engages with the light emitting part, and the light emitting unit is installed to the case by the insertion.

It is preferred that at least one of the light emitting housing body part of the light emitting unit housing and the light emitting unit holding part of the case is provided with a protrusion part, and in a state where an installation of the light emitting unit to the case is completed, the protrusion part is deformed such that the light emitting housing body part is held by the light emitting unit holding part.

It is preferred that the rotation of the light emitting unit is performed around a rotational axis passing through a center of the end surface of the first end of the light guide rod and a center of the light emitting surface of the light emitter of the light emitting unit, and in a state where the light emitting unit is installed, to the case, the light emitting unit holding part extends in a direction orthogonal to the rotational axis.

According to an embodiment, there is provided a line lighting device including: a light emitting unit that emits light; a light guide rod formed in a rod-like shape that transmits the light emitted by the tight emitting unit and guides the light in a longitudinal direction thereof; and a case formed in a rod-like shape that includes a case main body being partially opened when viewed from a longitudinal direction thereof and receiving the light guide rod therein, wherein the case has a first end which is one end in a longitudinal direction thereof and a second end which is another end in the longitudinal direction thereof, a value of a cross-sectional secondary moment of the case main body at a side of the first end of the case is larger than a value of the cross-sectional secondary moment of the case main body at a side of the second end of the case, and the cross-sectional secondary moment is a cross-sectional secondary moment of a plane which is orthogonal to the longitudinal direction of the case.

According to the embodiment, it is possible to provide a line lighting device capable of stabilizing a light emission of a light guide by eliminating a positional relationship shift between a first end of a light guide rod, which is one end of the light guide rod in a longitudinal direction, and a light emitter of a light emitting unit, even when vibration or the like occurs.

BRIEF DESCRIPTION OF THE DRAWINGS

FIG. 11A is a perspective view of a line lighting device according to a comparative example.

DETAILED DESCRIPTION

Figure 1:
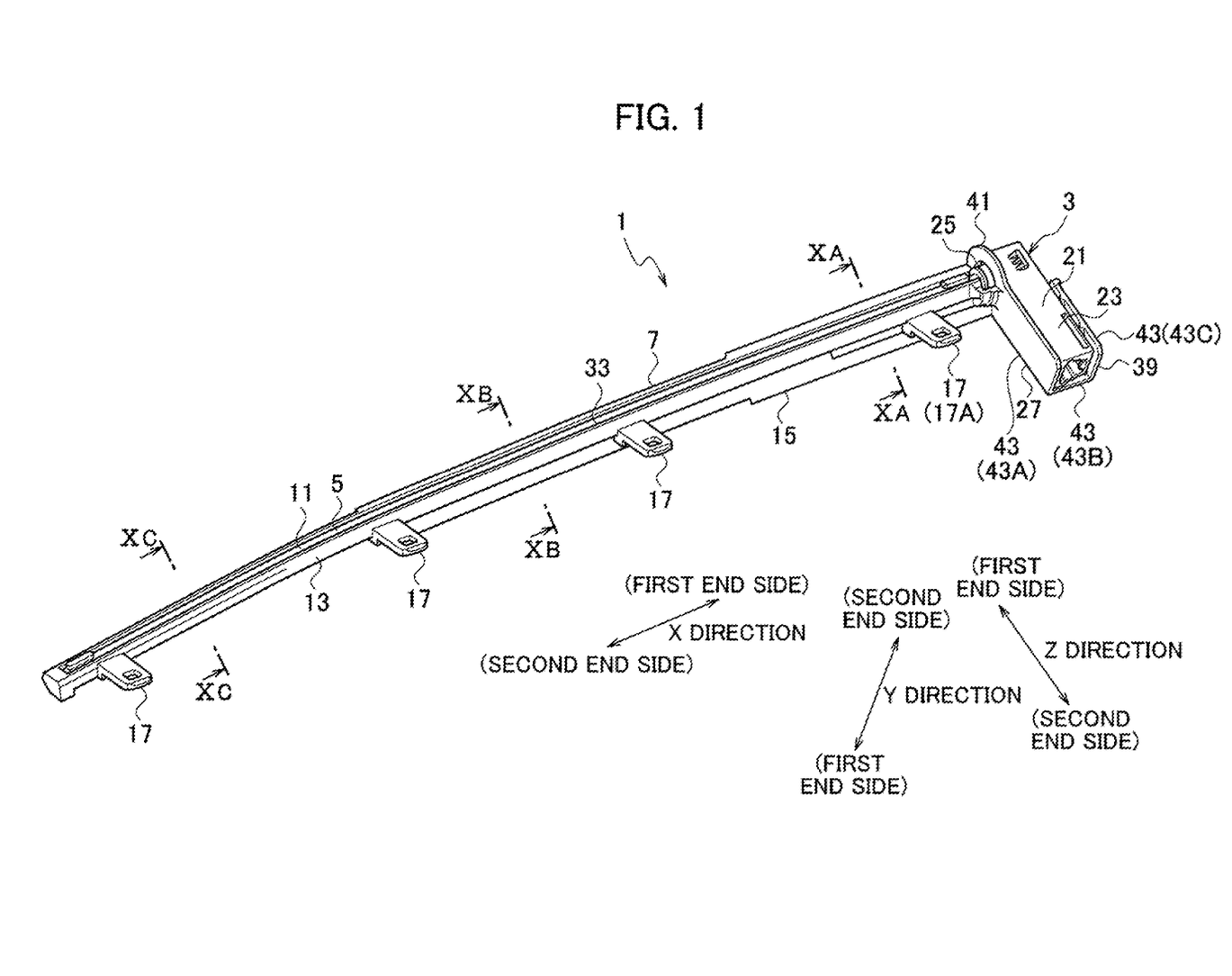
FIG. 1 is a perspective view of a line lighting device according to an embodiment of the disclosure.
Figures 2A, 2B:
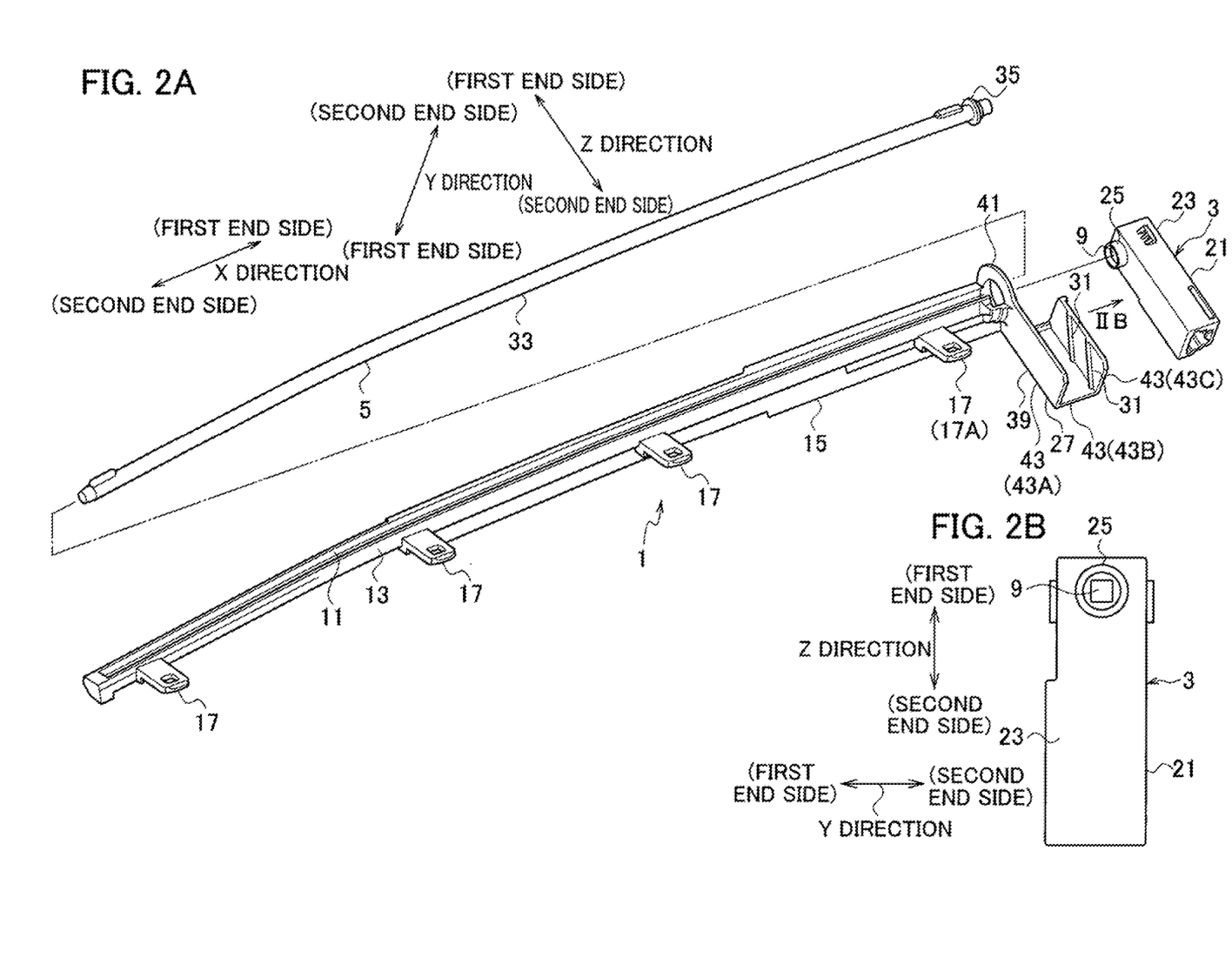
FIG. 2A is an exploded perspective view of the line lighting device.
FIG. 2B is an enlarged view as viewed from an arrow IIB in FIG. 2A.

A line lighting unit according to an exemplary embodiment will be described in detail below with reference to drawings. A line lighting device 1 is installed and used in an interior of a vehicle, for example. As illustrated in FIG. 1 and FIG. 2, the line lighting device 1 includes a light emitting unit 3, a light guide rod 5 and a case 7.

For convenience of explanation, a predetermined direction in the line lighting device is referred to as an X direction, a predetermined direction orthogonal to the X direction is referred to as a Y direction, and a direction orthogonal to the X direction and the Y direction is referred to as a Z direction.

Figure 7:
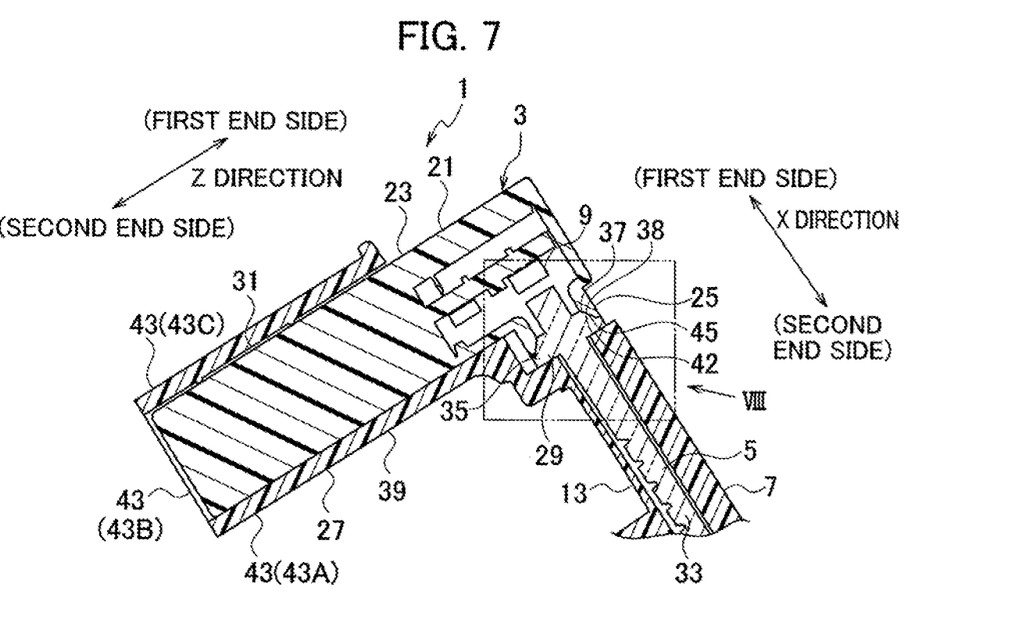
FIG. 7 is a view as viewed from an arrow VII-VII in FIG. 6.
Figure 8:
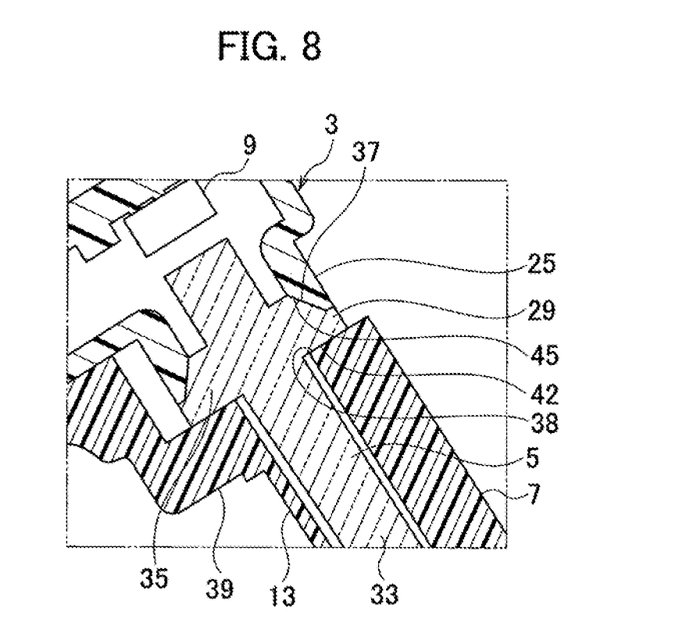
FIG. 8 is an enlarged view of a VIII portion in FIG. 7.

As illustrated in FIG. 7 and FIG. 8, the light emitting unit 3 includes a light emitter 9 for emitting light. The light emitter 9 includes an LED emitting visible light such as white light, for example.

The light guide rod 5 is made of a transparent material including colored transparency or a translucent material including colored transparency, and is formed in a rod-like shape such as a cylindrical shape elongated in the X direction. The light guide rod 5 is adapted to guide light entitled from the light emitting unit 3 in the X direction, which is a longitudinal direction of the light guide rod 5, by inserting the light from a first end of the light guide rod 5 in the longitudinal direction, which is one end of the light guide rod 5 in the longitudinal direction, into the light guide rod 5 and transmitting the light.

The case 7 is formed into an elongated rod-like shape using a material which does not allow light to pass, and includes a case main body 13. As illustrated in FIG. 2, FIG. 10A to FIG. 10F and the like, the case main body 13 is partially opened when viewed from the X direction which is a longitudinal direction of the case main body 13. That is, when the case main body 13 is viewed from the longitudinal direction, an opening portion 11 is formed in a part of the case main body 13. The light guide rod 5 is received and integrally installed in the case main body 13. In this installed state, the longitudinal direction of the light guide rod 5 and the longitudinal direction of the case main body 13 coincide with each other, and the light guide rod 5 and the case main body 13 extend in the X direction.

The light guide rod 5 and the case 7 have slight flexibility and can be slightly bent. Note that the longitudinal directions of the light guide rod 5 and the case 7 are defined as the X direction even when the light guide rod 5 and the case 7 are slightly bent.

In the line lighting device 1, the light emitting unit 3 is installed to the light guide rod 5 and the case 7 in the following manner.

Figure 3:
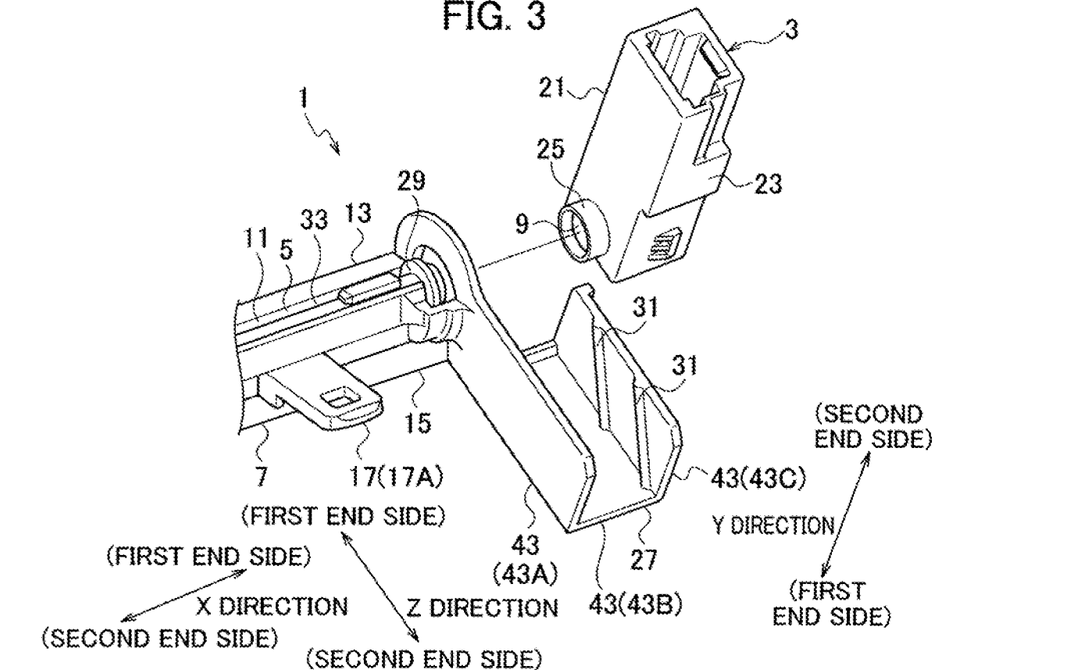
FIG. 3 is a diagram illustrating an installation procedure of a light emitting unit in the line lighting device.

First, as illustrated in FIG. 3, the first end of the light guide rod 5, which is one end of the light guide rod 5 in the longitudinal direction, is opposed to the light emitter 9 of the light emitting unit 3. In this state, an end surface of the first end of the light guide rod 5 in the longitudinal direction is a plane orthogonal to the X direction. A light emitting surface of the light emitter 9 of the light emitting unit 3 is also a plane orthogonal to the X direction.

Further, a first end side which is a side of one end of the light guide rod 5 in the longitudinal direction, is defined as a rear side. A second end side which is a side of the other end of the light guide rod 5 in the longitudinal direction, is defined as a front side. In a state where the first end of the light guide rod 5 is opposed to the light emitting surface of the light emitter 9 of the light emitting unit 3, the light emitting unit 3 is positioned behind the light guide rod 5 away from the light guide rod 5. When the state where the first end of the light guide rod 5 is opposed to the light emitting surface of the light emitter 9 of the light emitting unit 3, is viewed from the X direction, a center of the end surface of the first end of the light guide rod 5 coincides with a center of the light emitting surface of the light emitter 9.

Figure 4:
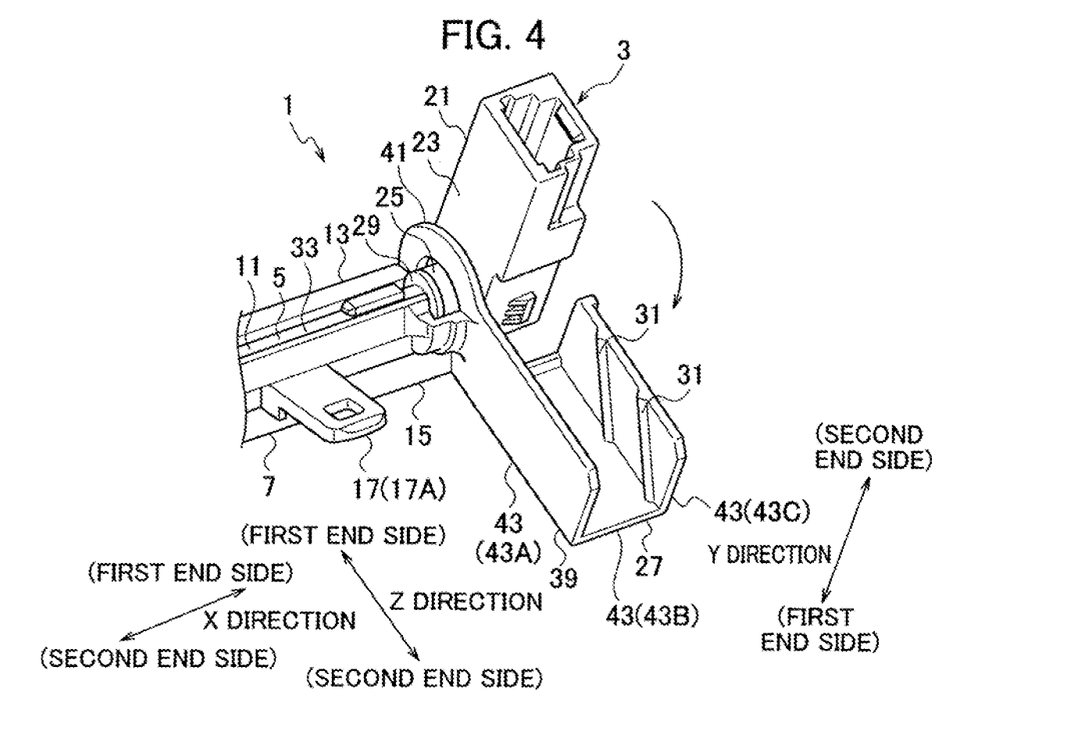
FIG. 4 is a diagram illustrating an installation procedure of the light emitting unit in the line lighting device.

Subsequently, the light emitting unit 3 is moved forward with respect to the light guide rod 5 from the state illustrated in FIG. 3. Then, as illustrated in FIG. 4, the light guide rod 5 and the light emitting unit 3 are brought close to each other.

Subsequently, as illustrated by an arrow in FIG. 4, the light emitting unit 3 is rotated with respect to the light guide rod 5 and the case 7 (case main body 13) by a predetermined angle. The rotation is performed about a central axis (rotational axis) extending in the X direction and passing through the center of the end surface of the first end of the light guide rod 5 and the center of the light emitting surface of the light emitter 9. Further, the rotation is performed while maintaining a state where the first end of the light guide rod 5 in the longitudinal direction and the light emitting surface of the light emitter 9 of the light emitting unit 3 are parallel to each other. Furthermore, the rotation is performed while maintaining a state where a distance between the first end of the light guide rod 5 in the longitudinal direction and the light emitting surface of the light emitter 9 of the light emitting unit 3 is constant.

Figure 5:
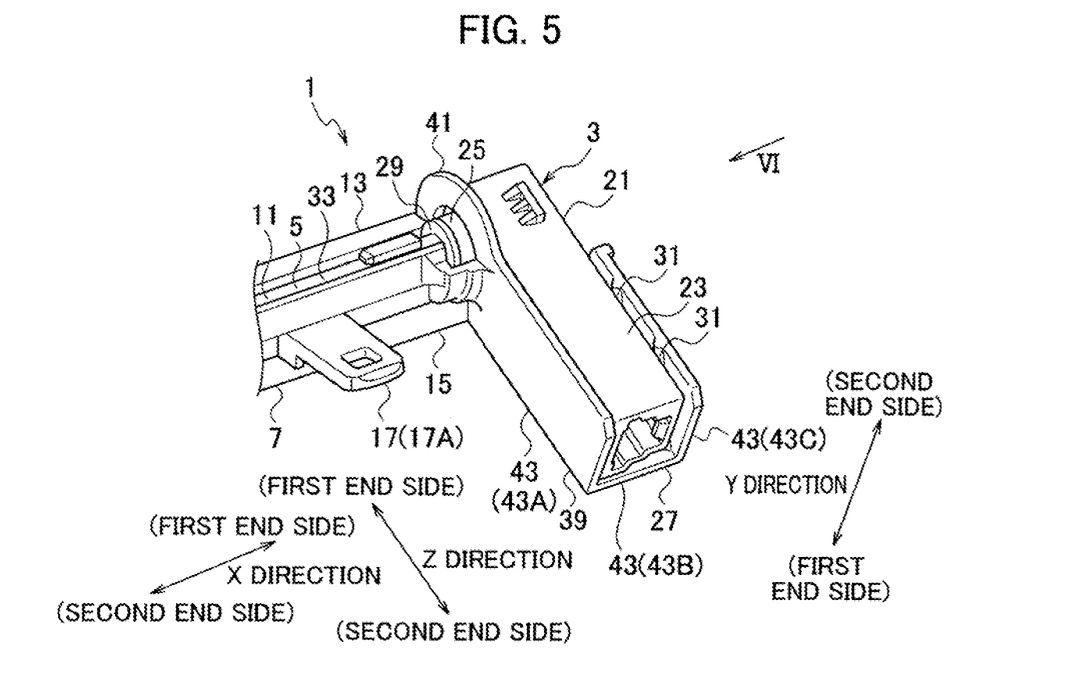
FIG. 5 is a diagram illustrating an installation procedure of the light emitting unit in the line lighting device.
Figure 6:
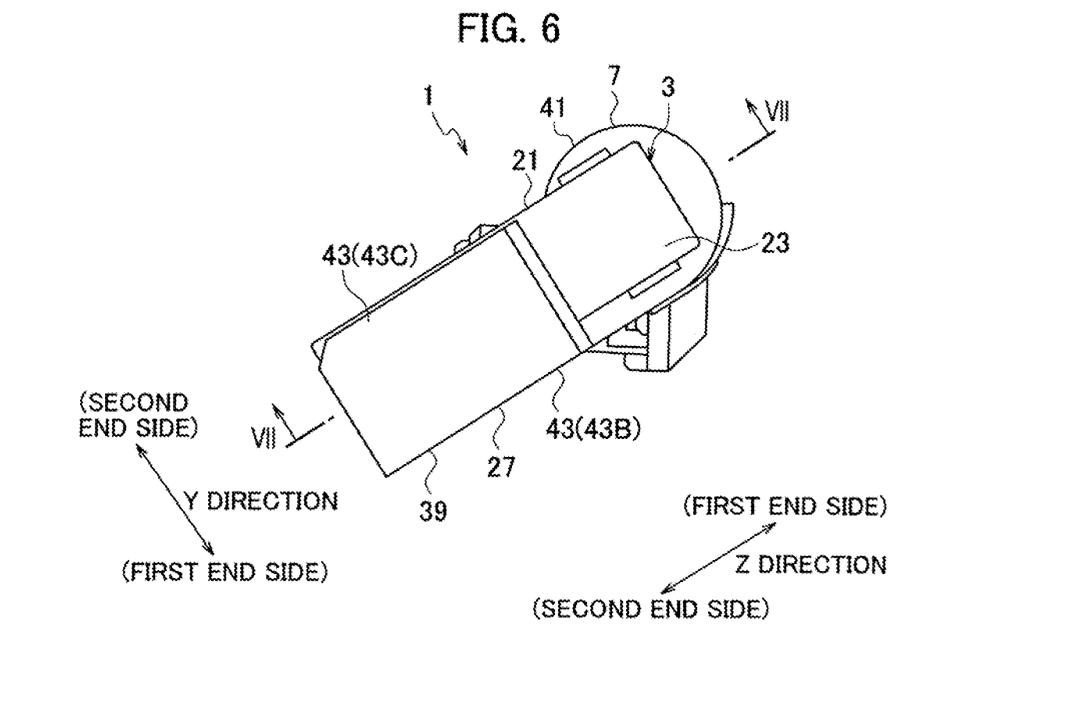
FIG. 6 is a view as viewed from an arrow VI in FIG. 5.

When the rotation is completed, as illustrated in FIG. 5 and FIG. 6, the installation of the light emitting unit 3 to the light guide rod 5 and the case 7 is completed. In the line lighting device 1, the light emitting unit 3 is integrally provided to the case 7 at first ends of the case 7 and the case main body 13 in the longitudinal direction of the case 7 and the case main body 13.

As illustrated in FIG. 1, FIG. 10A to FIG. 10F and the like, the case 7 includes a rib 15. The rib 15 protrudes from an outer periphery of the case main body 13 and extends in the longitudinal direction of the case main body 13. The rib 15 extends over the entire length of the ease main body 13, for example.

Figure 10A:
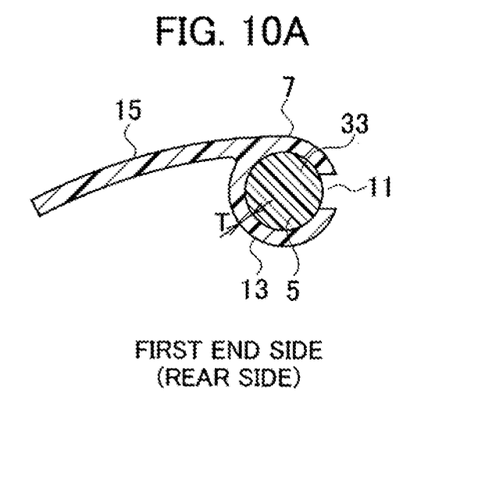
FIG. 10A is a diagram illustrating a XA-XA cross section in FIG. 1.
Figure 10B:
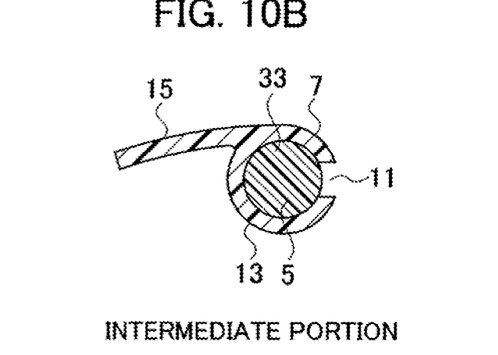
FIG. 10B is a diagram illustrating a XB-XB cross section in FIG. 1.
Figure 10C:
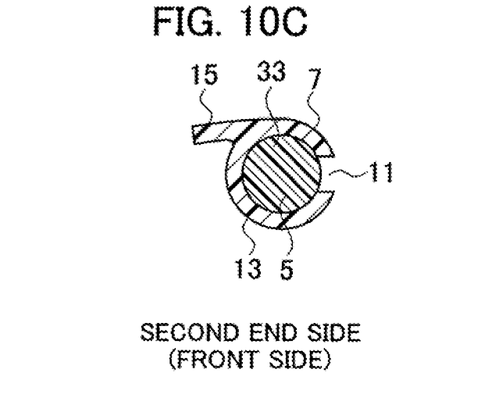
FIG. 10C is a diagram illustrating a XC-XC cross section in FIG. 1.

Next, two modes (configurations) of the rib 15 will be described. FIG. 10A, FIG. 10B and FIG. 10C illustrate a first mode. In the first mode, a protrusion amount (protrusion height) of the rib 15 in the case 7 from the case main body 13 is relatively large at a first end side of the case main body 13 in the longitudinal direction, and is relatively small at a second end side of the case main body 13 in the longitudinal direction.

Figure 10D:
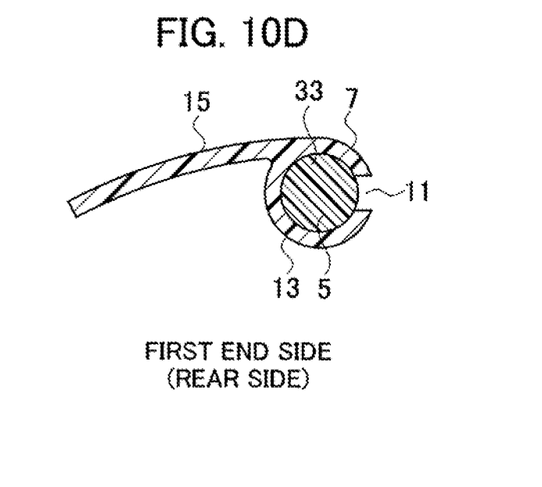
FIG. 10D is a diagram illustrating a modification of a rib and corresponds to FIG. 10A.
Figure 10E:
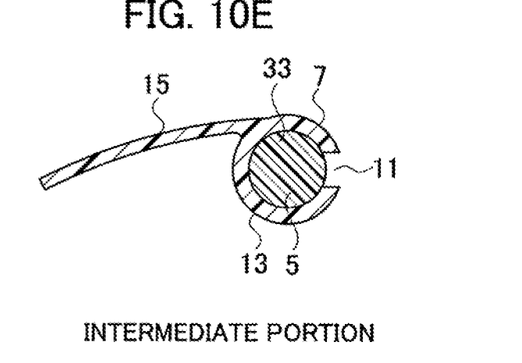
FIG. 10E is a diagram illustrating a modification of a rib and corresponds to FIG. 10B.
Figure 10F:
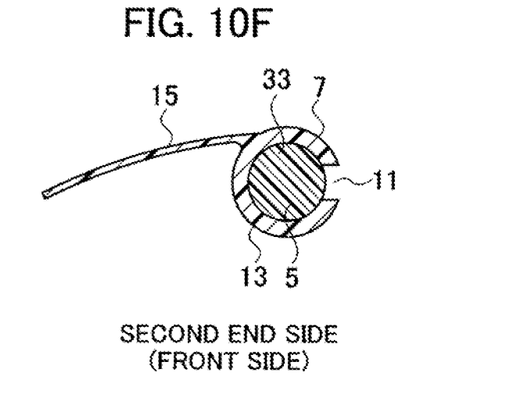

FIG. 10D, FIG. 10E and FIG. 10F illustrate a second mode. In the second mode, the thickness (width) of the rib 15 in the case 7 is relatively large at the first end side of the case main body 13 in the longitudinal direction, and is relatively small at the second end side of the case main body 13 in the longitudinal direction.

The rib 15 is provided in at least one of the first mode and the second mode. For example, the rib 15 may be provided in both the first mode and the second mode. Note, as illustrated in FIG. 10A to FIG. 10F, the cross-sectional shape of the case main body 13 in a plane perpendicular to the X direction, is constant in the longitudinal direction of the ease main body 13.

In the first mode, as illustrated in FIG. 1, FIG. 10A to FIG. 10C, and the like, the protrusion amount of the rib 15 in the case 7 from the case main body 13 is changed stepwise. More specifically, the protrusion amount of the rib 15 increases from a second end of the ease main body 13 in the longitudinal direction toward a first end of the case main body 13 in the longitudinal direction in multiple steps, for example, three steps or more.

As an example, a case where the protrusion amount of the rib 15 is changed in three steps will be described. For the purpose of explanation, the case main body 13 is divided in the longitudinal direction thereof into a portion on the first end side, an intermediate portion, and a portion on the second end side. In the portion on the first end side, as illustrated in FIG. 10A, the protrusion amount of the rib 15 from the case main body 13 has a constant value and is relatively large among, those in three portions. In the intermediate portion, as illustrated in FIG. 10B, the protrusion amount of the rib 15 from the case main body 13 has a constant value and is relatively medium among those in three portions. In the portion on the second end side, as illustrated in FIG. 10C, the protrusion amount of the rib 15 from the case main body 13 has a constant value and is relatively small among those in three portions.

In the second mode, the thickness of the rib 15 in the case 7 is changed stepwise. More specifically, the thickness of the rib 15 increases from the second end of the case main body 13 in the longitudinal direction toward the first end of the case main body 13 in the longitudinal direction in multiple steps of, for example, three steps or more.

As an example, a case where the thickness of the rib 15 is changed in three steps will be described. In the portion on the first end side, as illustrated in FIG. 10D, the thickness of the rib 15 has a constant value and is relatively large among those in three portions. In the intermediate portion, as illustrated in FIG. 10E, the thickness of the rib 15 has a constant value and is relatively medium among those in three portions. In the portion on the second end side, as illustrated in FIG. 10F, the thickness of the rib 15 has a constant value and is relatively small among those in three portions.

In FIG. 10D, FIG. 10E and FIG. 10F, one surface (e.g., upper surface) of the rib 15 in a thickness direction of the rib 15 is smoothly formed into a flat shape, and the other surface (e.g., lower surface) of the rib 15 in the thickness direction is stepped to change the thickness of the rib 15. On the other hand, steps may be provided on one surface of the rib 15 in the thickness direction or both surfaces of the rib 15 in the thickness direction to change the thickness of the rib 15.

As illustrate in FIG. 1 and FIG. 2, the outer periphery of the case main body 13 is provided with locking parts (locking claws) 17. The locking parts 17 are used for installing the case 7 to a case installation body 19 (see FIG. 9) formed on a vehicle panel, for example. In FIG. 10A to FIG. 10F, the locking parts 17 are omitted.

There are the locking parts 17. The case main body 13 is provided with each locking part 17 projecting from the case main body 13. The locking parts 17 are arranged apart from each other in the longitudinal direction of the case main body 13.

Figure 9:
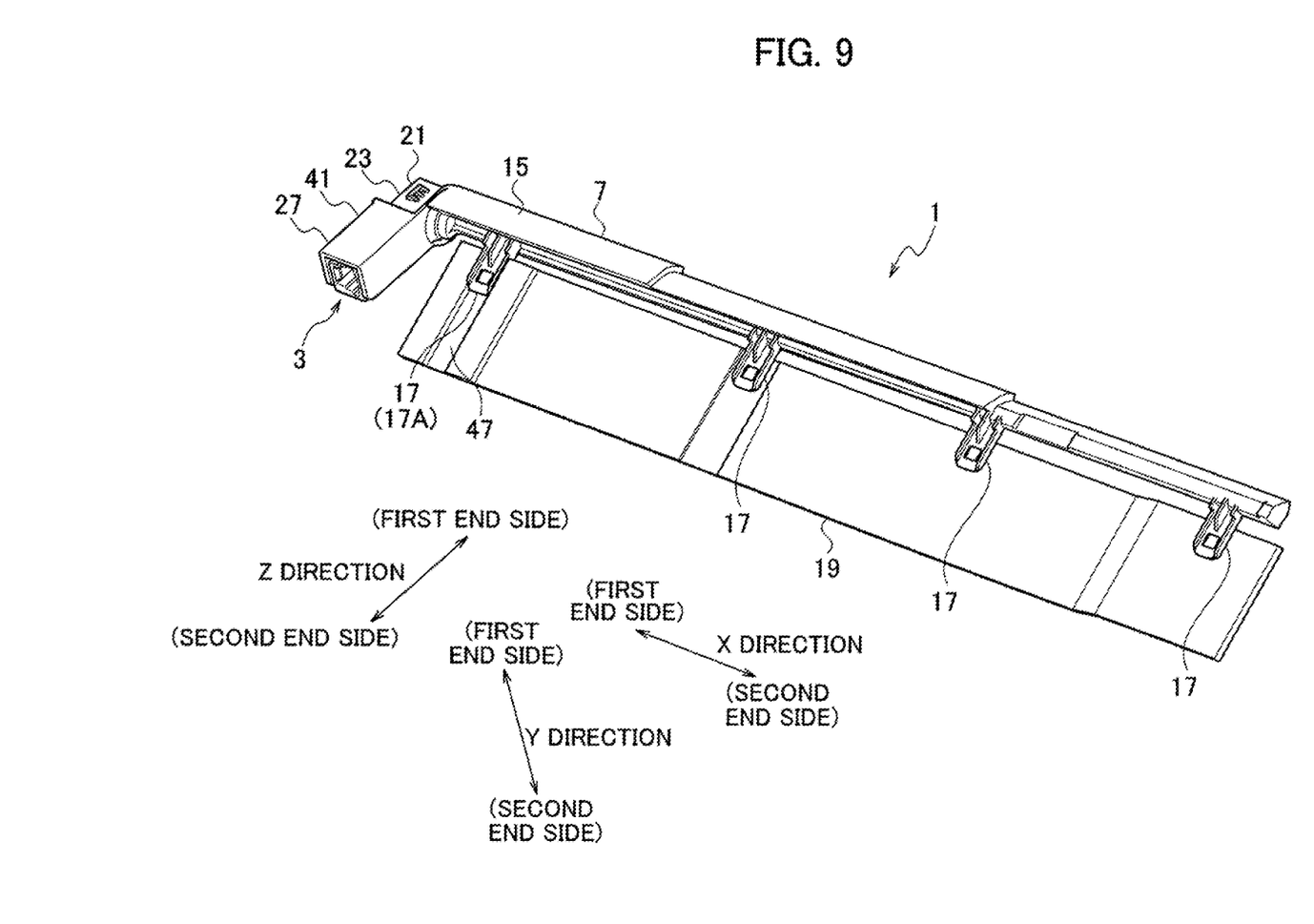
FIG. 9 is a perspective view illustrating an installation state of the line lighting device.

In the first mode, at least one of the locking parts 17 is provided at a position where the protrusion amount of the rib 15 from the case main body 13 is the largest. The at least one of the locking parts 17 is illustrated in FIG. 1, FIG. 2 and FIG. 9 by reference numeral "17A". In the second mode, at least one of the locking parts 17 is provided at a position where the thickness of the rib 15 is the largest.

As illustrated in FIG. 3, FIG. 7 and the like, the light emitting unit 3 includes a light emitting unit housing 21. The light emitter 9 is provided inside the light emitting unit housing 21. The light emitting unit housing 21 includes a light emitting unit housing body part 23 and a light emitting part 25 for emitting light of the light emitter 9 to the outside. The outer shape of the light emitting unit housing body 23 is formed, for example, in a rectangular parallelepiped shape. The light emitting part 25 is formed, for example, in a cylindrical shape.

The case 7 includes a light emitting unit holding part 27 for holding the light emitting unit housing 21 (light emitting unit housing body part 23). The light emitting unit holding part 27 is provided at the first end of the case main body 13 in the longitudinal direction.

As illustrated in FIG. 7 and FIG. 8, a light emitting part engaging part 29 for engaging with the light emitting part 25, is provided at the first end of the light guide rod 5 in the longitudinal direction. The light emitting part engaging part 29 may be provided at the first end of the case 7 in the longitudinal direction.

In the line lighting device 1, as described above, the light emitting unit 3 is integrally installed to the case 7 by a rotation of the light emitting unit 3. The light emitting unit 3 is rotated in a state where the light emitting part engaging part 29 engages with the light emitting part 25. The light emitting unit 3 is rotated with respect to the light guide rod 5 and the case 7.

By the rotation, the light emitting unit housing body part 23 is inserted into the light emitting unit holding part 27. By this insertion, the light emitting unit 3 is integrally installed to the case 7.

In the line lighting device 1, a central axis of the cylindrical light emitting part 25 coincides with a central axis of the cylindrical light guide rod 5. In a state where the installation of the light emitting unit 3 to the case 7 is completed, as illustrated in FIG. 8, the planar light emitting surface of the light emitter 9 is parallel to a first end surface (planar end surface) of the light guide rod 5 in the longitudinal direction, and is opposed to the first end surface of the light guide rod 5 with a slight interval. The light emitted from the light emitter 9 passes through the inside of the light emitting unit housing 21 and enters the light guide rod 5.

As illustrated in FIG. 3 and FIG. 4, the light emitting unit holding part 27 of the case 7 is provided with ribs (protrusion parts) 31. In a state where the installation of the light emitting unit 3 to the ease 7 is completed, the light emitting unit housing body part 23 is held by the light emitting unit holding part 27 with biasing force. The holding causes deformation of the ribs 31. For example, tips of the ribs 31 are slightly flattened.

In a state where the installation of the light emitting unit 3 to the case 7 is completed, the light emitting unit holding part 27 extends in a direction (Z direction) orthogonal to the rotational axis (X direction) of the light emitting unit 3.

The ribs 31 may be provided on a flat plate-shaped portion 43A, instead of or in addition to a flat plate-shaped portion 43C. The ribs 31 may be provided on the light emitting unit housing body part 23 of the light emitting unit housing 21 instead of or in addition to the light emitting unit holding part 27. That is, the ribs 31 may be provided on at least one of the light emitting unit housing body part 23 of the light emitting unit housing 21 and the light emitting unit holding part 27 of the case 7.

Next, the line lighting device 1 will be described in more detail.

The light guide rod 5 includes a cylindrical light guide rod main body 33 extending in the X direction, and a disk-shaped flange 35. The flange 35 is provided at a first end of the light guide rod main body 33 in the longitudinal direction. Although the light guide rod main body 33 and the flange 35 are integrally molded, the light guide rod main body 33 and the flange 35 may be separately molded, and then the flange 35 may be integrally mounted to the light guide rod main body 33.

A thickness direction of the flange 35 corresponds to the X direction. An engaging surface 37 is formed on a first end side of the flange 35 in the X direction. The engaging surface 37 is formed by a side surface of a truncated cone side. A central axis of the light guide rod main body 33 coincides with a central axis of the flange 35 and a central axis of the engaging surface 37.

The light emitting unit holding part 27 of the case 7 includes a holding part main body 39 and a flange-shaped portion 41. Although the case 7 is integrally molded, the case main body 13, the holding part main body 39 and the flange-shaped portion 41 may be separately molded, and then the holding part main body 39 and the flange-shaped portion 41 may be integrally mounted to the case main body 13.

The flange-shaped portion 41 is provided at the first end of the case main body 13 in the longitudinal direction, and a thickness direction of the flange-shaped portion 41 corresponds to the X direction. A central axis of the case main body 13 coincides with a central axis of the flange-shaped portion 41.

The holding part main body 39 includes three rectangular flat plate-shaped portions 43 (43A, 43B and 43C), and is connected to the case main body 13 via the flange-shaped portion 41, for example.

The holding part main body 39 protrudes from the first end of the case main body 13 in the longitudinal direction toward the rear side in the X direction. Thickness directions of the flat plate-shaped portions 43A and 43C correspond to the X direction. A thickness direction of the flat plate-shaped portion 43B corresponds to the Y direction.

When the holding part main body 39 is viewed from the Y direction, as illustrated in FIG. 7, the flat plate-shaped portion 43A Linearly protrudes from the flange-shaped portion 41 a predetermined length. When the holding part main body 39 is viewed from the Y direction, the flat plate-shaped portion 43B has a rectangular shape and protrudes backward from the flat plate-shaped portion 43A. One side of the rectangular flat plate-shaped portion 43B substantially coincides with the flat plate-shaped portion 43A. When the holding part main body 39 is viewed from the Y direction, the flat plate-shaped portion 43C linearly protrudes a predetermined length. The other side of the rectangular flat plate-shaped portion 43B substantially coincides with the flat plate-shaped portion 43C.

As illustrated in FIG. 3, FIG. 4 and FIG. 7, the ribs 31 of the light emitting unit holding part 27 are formed in a linear shape, and are formed on the flat plate-shaped portion 43C. More specifically, the ribs 31 are formed on a surface of the flat plate-shaped portion 43C facing the flat plate-shaped portion 43A.

When viewed from the X direction, the ribs 31 are parallel to each other and extend obliquely with respect to the Z direction and the Y direction. More specifically, one end of each rib 31 in the extending direction is located on a first end side, which is one end in the Z direction, and the other end of each rib 31 in the extending direction is located on a second end side, which is the other end in the Z direction. One end of each rib 31 in the extending direction is located on a side opposite to the flat plate-shaped portion 43B, and the other end of each rib 31 in the extending direction is located on a side of the flat plate-shaped portion 43B.

When viewed from the X direction, the flat plate-shaped portions 43 protrude from the case main body 13 toward the second end side of the Z direction.

A dimension value between the flat plate-shaped portions 43A and 43C in the X direction is equal to or slightly larger than a dimension value of the light emitting unit housing body part 23 in the X direction.

A dimension value between the flat plate-shaped portion 43A and each rib 31 on the flat plate-shaped portion 43C in the X direction is slightly smaller than a dimension value of the light emitting unit housing body part 23 in the X direction, in a state before the light emitting unit housing 21 is installed.

The light emitting part 25 is formed in a cylindrical shape, and protrudes forward from the light emitting unit housing body part 23 (a second end side of the X direction) such that a central axis of the light emitting part 25 extends in the X direction. In the Y direction, the light emitting part 25 is located at a center of the light emitting unit housing body part 23, in a state after the light emitting unit housing 21 is installed. In the Z direction, the light emitting part 25 is located on a first end side of the light emitting unit housing body part 23, in a state after the light emitting unit housing 21 is installed.

On a second end side of the light emitting part 25 in the X direction (rear side), an engaging surface 45 is formed by a side surface of a truncated cone. A central axis of the light emitting part 25 coincides with a central axis of the engaging surface 45.

When the light emitting unit 3 is rotated with respect to the light guide rod 5 and the case 7 such that the light emitting unit 3 is installed to the light guide rod 5 and the case 7, the engaging surface 37 of the flange 35 of the light guide rod 5 is in surface contact with the engaging surface 45 of the light emitting part 25 of the light emitting unit 3.

Even after the light emitting unit 3 is installed to the light guide rod 5 and the case 7, as illustrated in FIG. 8, the engaging surface 37 of the flange 35 of the light guide rod 5 is in surface contact with the engaging surface 45 of the light emitting part 25 of the light emitting unit 3. In a state where the light emitting unit 3 has been installed to the light guide rod 5 and the case 7, a plane 38 of the flange 35 on a side opposite to the engaging surface 37 of the flange 35 in the X direction is in surface contact with a plane 42 of the flange-shaped portion 41 of the case 7. Thus, the flange 35 of the light guide rod 5 is sandwiched between the case 7 and the light emitting unit 3.

By this sandwiching, the light guide rod 5, the case 7 and the light emitting unit 3 are integrated at least in the X direction. Further, a centering is provided by this sandwiching. That is, when viewed from the X direction, a center of the light guide rod 5 coincides with a center of the light emitter 9.

Each of the locking parts 17 of the light guide rod 5 is formed in an elongated rectangular parallelepiped shape. The locking parts 17 are provided and are separated from each other in the X direction. In the Y direction and the Z direction, protrusion directions and protrusion amounts of the respective locking parts 17 from the case main body 13 coincide with each other, for example.

As illustrated in FIG. 9, a plurality of grooves 47 is formed on the case installation body 19 to which the line lighting apparatus 1 is to be installed. A dimension value of each groove 47 in the X direction (width dimension value) is substantially equal to a dimension value of each locking part 17 in the X direction (width dimension value).

A locking part 17A is fitted in the corresponding groove 47 such that the line lighting device 1 is installed to the case installation body 19. The locking part 17A is provided on the rib 15 having the largest protrusion from the case main body 13 or having the largest thickness. Each groove 47 serves as an assembly reference when the line lighting device 1 is assembled to the case installation body 19.

Next, operation of the line lighting device 1 will be described below.

When the light emitting unit 3 emits light, the light enters the light guide rod 5 from the first end surface of the light guide rod 5 in the longitudinal direction, and travels in the light guide rod 5 toward a second end of the light guide rod 5 in the longitudinal direction. The first end surface of the light guide rod 5 has a circular shape.

Then, the light is emitted from a side surface of the light guide rod 5, and the emitted light is linearly emitted from the open portion 11 of the case 7 to the outside of the line lighting device 1.

In the line lighting device 1, the light emitting unit 3 is installed on the light guide rod 5 and the case 7 by rotating the light emitting unit 3 by a predetermined angle with respect to the light guide rod 5 and the case 7, while the first end of the light guide rod 5 in the longitudinal direction is opposed to the light emitter 9 of the light emitting unit 3.

In the line lighting device 1, the light emitting unit 3 is rotated by the predetermined angle with respect to the light guide rod 5 and the case 7, while maintaining a state where the first end surface of the light guide rod 5 in the longitudinal direction is parallel to the light emitting surface of the light emitter 9 of the light emitting unit 3.

With this structure, even when vibration or the like occurs, a positional relationship shift between the first end of the light guide rod 5, which is one end of the light guide rod 5 in the longitudinal direction, and the light emitter 9 of the light emitting unit 3 can be eliminated, which stabilizes the light emission from the light guide rod 5.

Figure 11A:
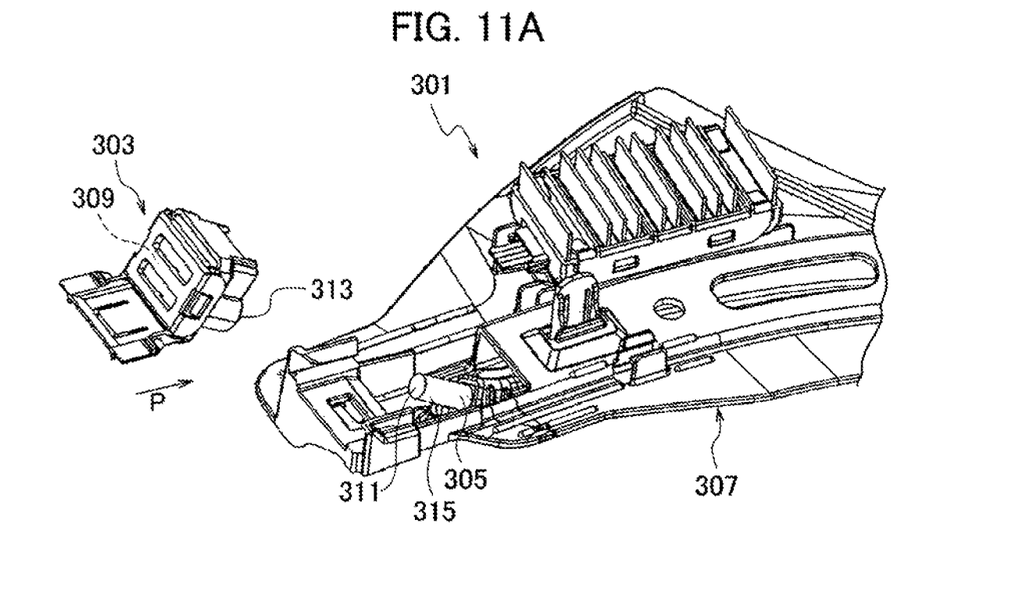
FIG. 11A is a diagram illustrating a modification of a rib and corresponds to FIG. 10C.
Figure 11B:
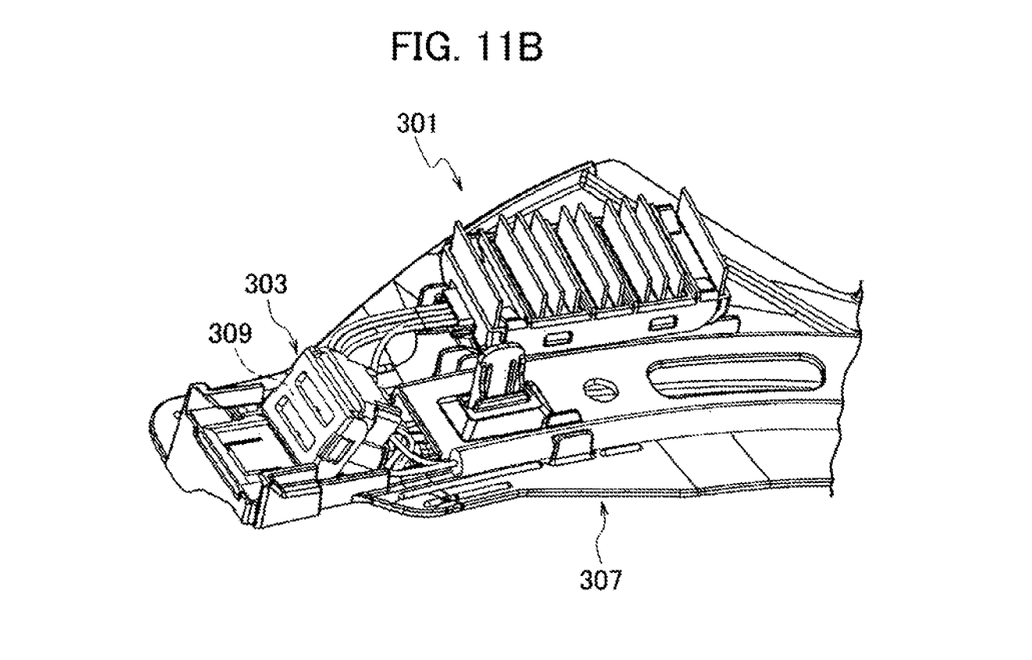
FIG. 11B is a perspective view of the line lighting device according to the comparative example.

On the other hand, as illustrated in FIG. 11A and FIG. 11B, the lighting device 301 according to a comparative example includes a light emitting member 303, a light guide 305, and a housing 307.

The light emitting member 303 includes a light source 309. The light guide 305 is adapted to guide light of the light source 309 incident from an incident surface which is an end surface 311 thereof in the longitudinal direction. The housing 307 accommodates the light emitting member 303 and the light guide 305.

The light emitting member 303 is formed with a receiving recess 313 recessed in a direction different from a moving direction P for engaging the light emitting member 303 with the housing 307. The different direction is set in such a direction that an end portion 315 of the light guide 305 is fitted into the receiving recess 313 while being bent by a movement of the light emitting member 303 in the moving direction.

Therefore, in the lighting device 301 according to the comparative example, when vibration or the like occurs due to traveling of the vehicle, a positional relationship between the light emitting member 303 and the end portion of the light guide 305 may be shifted due to the vibration or the like.

On the other hand, according to the line lighting device 1, since the line lighting device 1 is configured as described above, even when vibration or the like occurs, it is possible to eliminate the positional relationship shift between the first end, which is one end of the light guide rod 5 in the longitudinal direction, and the light emitter 9 of the light emitting unit 3.

In the line lighting device 1, as described above, the rib 15 of the case 7 is provided in at least one of the first mode and the second mode. Thus, a reinforcement of the case 7 can be performed only at a place where rigidity is required while reducing an amount of material to be used for forming the case 7.

In the line lighting device 1, the shape of the rib 15 is changed stepwise. Thus, a range for selecting a portion of the rib 15 on which the locking part 17A is installed can be widened, and a degree of bending rigidity in each portion of the case 7 can be easily known by visual observation.

In the line lighting device 1, the locking part 17A is provided at a position where the rib 15 of the case 7 has the largest protrusion amount. This indicates that the locking part 17A is provided at a position where the case 7 has the highest bending rididity.

Since the locking part 17A is provided in this manner, the line lighting device 1 can be installed to the case installation body 19 at an accurate position by using the locking part 17A as an installation reference when the case 7 including the light guide rod 5 is assembled to the case installation body 19.

At a position away from the locking part 17A, the bending rigidity of the case 7 including the light guide rod 5 is lowered. This allows the case 7 including the light guide rod 5 to be easily bent, which facilitates the assembling work of the case 7 to the case installation body 19.

In the line lighting device 1, the rigidity of the first end side of the case 7 in the X direction is increased by the rib 15. The light emitting unit 3 is installed on the first end of the case 7 in the X direction. Thus, the light emitting unit 3 is installed to the case 7 in such a manner that a deformation amount of the case 7 is small, which allows the light emitting unit 3 to be accurately installed to the case 7 and the light guide rod 5.

In the line lighting device 1, the case 7 includes the light emitting unit holding part 27, and the light guide rod 5 includes the light emitting part engaging part 29 to be engaged with the light emitting part 25. In a state where the light emitting part engaging part 29 is engaged with the light emitting part 25, the light emitting unit housing body part 23 enters the light emitting unit holding part 27 by rotating the light emitting unit 3 with respect to the case 7. Thereby, the light emitting unit 3 is installed to the case 7.

Thus, the light emitting unit 3 can be rotated accurately with respect to the case 7, which allows the light emitting unit 3 to be easily installed to the light guide rod 5 and the case 7.

In the line lighting device 1, when the installation of the light emitting unit 3 to the case 7 is finished, the light emitting unit housing body part 23 is held by the light emitting unit holding part 27 using deformation of the ribs 31. With this configuration, the rattling of the light emitting unit 3 to the case 7 can be surely eliminated. This can eliminate the instability of the light emission of the light guide rod 5 due to vibration.

Note in the line lighting device 1, a value of a cross-sectional secondary moment of the case main body 13 and the rib 15 may be large on a first end side of the case 7 in the longitudinal direction and small on a second end side of the case 7 in the longitudinal direction. The cross-sectional secondary moment is a cross-sectional secondary moment of a plane, which is orthogonal to the longitudinal direction of the case 7, with respect to a predetermined neutral plane.

As described above, a cross-sectional shape of the case main body 13 by a plane orthogonal to the X-direction, is constant in the X-direction. On the other hand, a cross-sectional shape of the assembly of the case main body 13 and the rib 15 by a plane orthogonal to the X-direction, is changed in the X-direction because the rib 15 is provided to the case main body 13. The predetermined neutral plane is a predetermined plane including the central axis of the case main body 13 extending in the longitudinal direction of the case main body 13. For example, the predetermined neutral plane is a plane including the central axis of the case main body 13 extending in the X direction and orthogonal to the Z direction.

Instead of the cross-sectional secondary moment, a cross-sectional secondary polar moment may be used. In this case, the origin of the cross-sectional secondary polar moment is, for example, a predetermined point on the central axis of the case main body 13 extending in the longitudinal direction of the case main body 13.

Instead of or in addition to providing the rib 15 of the case 7 in the above-described first or second mode, the case main body 13 may be formed in a third mode. Note the case 7 may be formed in at least one of the first, second and third modes.

In the third mode, a wall thickness T (see FIG. 10) of the case main body 13 is relatively large at the first end side which is one end of the case main body 13 in the longitudinal direction and is relatively small at the second end side which is the other end of the case main body 13 in the longitudinal direction.

In the third mode, for example, the wall thickness of the case main body 13 is increased in stages from the second end of the case main body 13 in the longitudinal direction toward the first end of the ease main body 13 in the longitudinal direction.

Instead of or in addition to providing the rib 15 of the case 7 in the first or second mode, when the ease main body 13 is formed in the third mode, the cross-sectional secondary moment of the case 7 is also changed as described above.

Although the present embodiment has been described above, the disclosure is not limited to the present embodiment. Various modifications can be made within the scope of the gist of the present embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A line lighting device comprising:
 a light emitting unit that includes a light emitter emitting light;
 a light guide rod formed in a rod-like shape that transmits the light emitted by the light emitting unit and guides the light in a longitudinal direction thereof; and
 a case formed in a rod-like shape that includes a case main body being partially opened in a longitudinal direction thereof and receiving the light guide rod therein,
 wherein
 the light guide rod has a first end which is one end in the longitudinal direction thereof, and the light emitting unit is installed to the light guide rod and the case by rotating the light emitting unit by a predetermined angle with respect to the light guide rod and the case, while maintaining a state where (i) the first end of the light guide rod is opposed to the light emitter of the light emitting unit and (ii) a planar end surface of the first end of the light guide rod is parallel to a light emitting surface of the light emitter of the light emitting unit.

2. The line lighting device according to claim 1, wherein the case main body has a first end which is one end in the longitudinal direction thereof and a second end which is another end in the longitudinal direction thereof, and the case is formed in at least one of a first mode, a second mode and a third mode, the first mode being a mode in which (i) the case is provided with a rib protruding from an outer periphery of the case main body and extending in the longitudinal direction of the case main body, and (ii) a protrusion amount of the rib from the case main body at a side of the first end of the case main body is larger than a protrusion amount of the rib from the case main body at a side of the second end of the case main body, the second mode being a mode in which (i) the case is provided with a rib protruding from an outer periphery of the case main body and extending in the longitudinal direction of the case main body, and (ii) a thickness of the rib at a side of the first end of the case main body is larger than a thickness of the rib at a side of the second end of the case main body, and the third mode being a mode in which a wall thickness of the case main body at a side of the first end of the case main body is larger than a wall thickness of the case main body at a side of the second end of the case main body.

3. The line lighting device according to claim 2, wherein in the first mode, the protrusion amount of the rib increases stepwise from the second end of the case main body to the first end of the case main body, in the second mode, the thickness of the rib increases stepwise from the second end of the case main body to the first end of the case main body, and in the third mode, the wall thickness of the case main body increases stepwise from the second end of the case main body to the first end of the case main body.

4. The line lighting unit according to claim 2, wherein the case main body is provided with a locking part used for installing the case to a case installation body, at the outer periphery thereof, in the first mode, the locking part is provided at a position where the protrusion amount of the rib is relatively large, and in the second mode, the locking part is provided at a position where the thickness of the rib is relatively large.

5. The line lighting unit according to claim 1, wherein the light emitting unit includes a light emitting unit housing, the light emitter is provided in the light emitting unit housing, the light emitting unit housing includes a light emitting unit housing body part, and a light emitting part for emitting the light of the light emitter to an outside of the light emitting unit housing, the case includes a light emitting unit holding part for holding the light emitting unit housing, one of the case and the light guide rod is provided with a light emitting part engaging part for engaging with the light emitting part, the light emitting unit housing body part is inserted into the light emitting unit holding part by a rotation of the light emitting unit to the case and the light guide rod in a state where the light emitting part engaging part engages with the light emitting part, and the light emitting unit is installed to the case by the insertion.

6. The line lighting device according to claim 5, wherein at least one of the light emitting housing body part of the light emitting unit housing and the light emitting unit holding part of the case is provided with a protrusion part, and in a state where an installation of the light emitting unit to the case is completed, the protrusion part is deformed such that the light emitting housing body part is held by the light emitting unit holding part.

7. The line lighting device according to claim 5, wherein the rotation of the light emitting unit is performed around a rotational axis passing through a center of the end surface of the first end of the light guide rod and a center of the light emitting surface of the light emitter of the light emitting unit, and in a state where the light emitting unit is installed to the case, the light emitting unit holding part extends in a direction orthogonal to the rotational axis.

8. A line lighting device comprising:

a light emitting unit that emits light;

a light guide rod formed in a rod-like shape that transmits the light emitted by the light emitting unit and guides the light in a longitudinal direction thereof; and a case formed in a rod-like shape that includes a case main body being partially opened in a longitudinal direction thereof and receiving the light guide rod therein, wherein the case has a first end which is one end in a longitudinal direction thereof and a second end which is another end in the longitudinal direction thereof, a value of a cross-sectional secondary moment of the case main body increases in stages from the second end of the case toward the first end of the case, and the cross-sectional secondary moment is a cross-sectional secondary moment of a plane which is orthogonal to the longitudinal direction of the case.

* * * * *